(12) United States Patent
An et al.

(10) Patent No.: US 10,836,931 B2
(45) Date of Patent: Nov. 17, 2020

(54) ADHESIVE COMPOSITION AND OPTICAL LAMINATE USING THE SAME

(71) Applicant: DONGWOO FINE-CHEM CO., LTD., Iksan-si (KR)

(72) Inventors: Myungyoung An, Incheon (KR); Han Young Choi, Pyeongtaek-si (KR); Kiryong Song, Seoul (KR)

(73) Assignee: DONGWOO FINE-CHEM CO., LTD., Iksan (KR)

( * ) Notice: Subject to any disclaimer, the term of this patent is extended or adjusted under 35 U.S.C. 154(b) by 101 days.

(21) Appl. No.: 15/865,899

(22) Filed: Jan. 9, 2018

(65) Prior Publication Data

US 2018/0194969 A1  Jul. 12, 2018

(30) Foreign Application Priority Data

Jan. 11, 2017  (KR) .......... 10-2017-0004320

(51) Int. Cl.

| | | |
|---|---|---|
| *C09J 4/00* | (2006.01) | |
| *G06F 3/044* | (2006.01) | |
| *B32B 27/28* | (2006.01) | |
| *B32B 7/12* | (2006.01) | |
| *C09J 4/06* | (2006.01) | |

(52) U.S. Cl.
CPC ............ *C09J 4/00* (2013.01); *B32B 7/12* (2013.01); *B32B 27/281* (2013.01); *C09J 4/06* (2013.01); *G06F 3/044* (2013.01); *B32B 2307/42* (2013.01); *B32B 2457/208* (2013.01); *G06F 2203/04103* (2013.01)

(58) Field of Classification Search
None
See application file for complete search history.

(56) References Cited

U.S. PATENT DOCUMENTS 3,844,916 A * 10/1974 Gaske ................ C08F 20/20
522/33
4,547,562 A * 10/1985 Nichols ............ C08G 59/4035
525/423

(Continued)

FOREIGN PATENT DOCUMENTS

JP  4711354 B2  6/2011
JP  2015108100 A *  6/2015

(Continued)

OTHER PUBLICATIONS

Frisoli—Time-Resolved_UV_Absorption_of_Polyimide—Appl. Phys. 1991 (Year: 1991).*

(Continued)

*Primary Examiner* — Callie E Shosho
*Assistant Examiner* — John Vincent Lawler
(74) *Attorney, Agent, or Firm* — Sughrue Mion, PLLC

(57) ABSTRACT

An adhesive composition includes a (meth)acrylate monomer, a photocurable (meth)acrylate oligomer, a photoinitiator and a tertiary amine compound. Also, an optical laminate includes an adhesive layer formed of the adhesive composition. The adhesive composition can attach an optical layer simultaneously including a UV permeable region and a UV impermeable region onto a UV impermeable substrate with excel lent adhesive strength.

16 Claims, 1 Drawing Sheet

(56) References Cited

U.S. PATENT DOCUMENTS

| | | | |
|---|---|---|---|
| 6,841,588 B1* | 1/2005 | Bolton | C08G 12/40 522/84 |
| 2007/0287762 A1* | 12/2007 | Casati | C08G 18/4072 521/172 |
| 2013/0012611 A1* | 1/2013 | Davidson | C07C 227/10 522/53 |
| 2015/0218398 A1* | 8/2015 | Loccufier | C09D 11/107 347/102 |
| 2016/0231972 A1* | 8/2016 | You | G06F 1/00 |
| 2016/0253035 A1* | 9/2016 | Mitamura | B32B 7/12 345/174 |

FOREIGN PATENT DOCUMENTS

| | | |
|---|---|---|
| KR | 1991-0012804 A | 7/1991 |
| KR | 10-2009-0039345 A | 4/2009 |
| KR | 10-1359470 B1 | 2/2014 |

OTHER PUBLICATIONS

Ciba—Irgacure—photo_uv_2 (Year: 2001).*
Ishizaki—JP 2015-108100 A—MT—light-polymerizable resin w—comp.#1-2015 (Year: 2015).*
Shao—Visible light initiating systems—Roy.Soc.Chem.—2014 (Year: 2014).*

* cited by examiner

【FIG. 1】
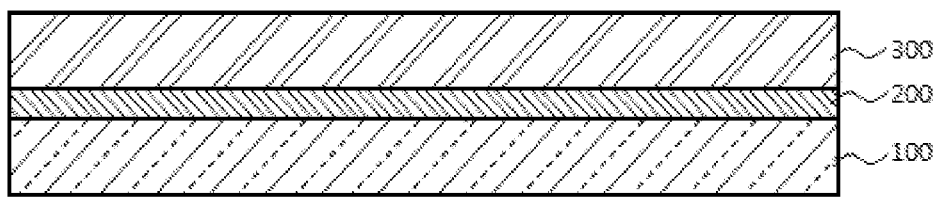
【FIG. 2】
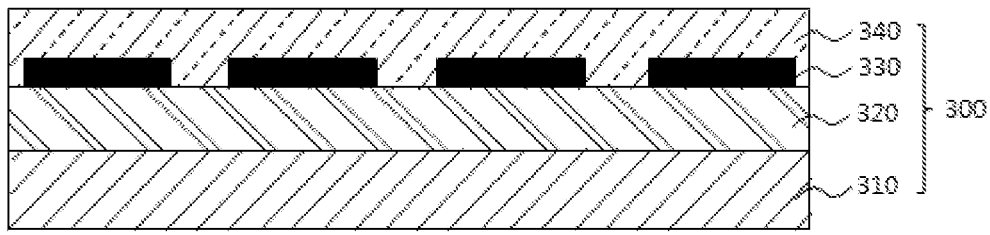

ADHESIVE COMPOSITION AND OPTICAL LAMINATE USING THE SAME

CROSS REFERENCE TO RELATED APPLICATIONS

This application claims priority based on Korean Patent Application No. 10-2017-0004320, filed Jan. 11, 2017, the content of which is incorporated herein by reference in its entirety.

TECHNICAL FIELD

The present invention relates to an adhesive composition and an optical laminate using the same. More specifically, the present invention relates to an adhesive composition capable of attaching an optical layer including an ultraviolet permeable region and an ultraviolet impermeable region with excellent adhesive strength, and an optical laminate using the same.

BACKGROUND ART

A touch sensor is a device in which, when a user touches an image displayed on the screen with one's finger, a touch pen, or the like, a touch point is grasped in response to such a touch. The touch sensor is manufactured as a structure mounted on a display device such as a liquid crystal display (LCD), an organic light emitting diode (OLED), and the like.

Such touch sensor can be applied by being attached onto a variety of substrates with a UV curable adhesive. However, when such substrate is a UV impermeable substrate, curing of the adhesive must proceed by irradiating UV light on the touch sensor side. However, since the touch sensor includes a UV impermeable region together with a UV permeable region, the use of conventional UV curable adhesives results in insufficient curing since sufficient ultraviolet rays do not reach the adhesive located under the UV impermeable region of the touch sensor. Thereby, there was a problem that their adhesive strength is lowered.

As a technique for improving the curing of the adhesive existing in a UV impermeable region, Japanese Patent No. 4,711,354 discloses a technique of allowing an organic peroxide to be contained in an adhesive, and heating after UV irradiation to thereby cure the adhesive in a UV impermeable region. However, there is a limitation because the heating process can damage the substrate or the like.

Therefore, there is a need to develop techniques for an adhesive composition capable of attaching an optical layer simultaneously including a UV permeable region and a UV impermeable region to a UV impermeable substrate with excellent adhesive strength.

DISCLOSURE

Technical Problem

It is an object of the present invention to provide an adhesive composition capable of attaching an optical layer including a UV permeable region and a UV impermeable region with excellent adhesive strength.

It is another object of the present invention to provide an optical laminate formed using the adhesive composition.

Technical Solution

In accordance with one aspect of the present invention, there is provided an adhesive composition comprising: a (meth)acrylate monomer, a photocurable (meth)acrylate oligomer, a photoinitiator and a tertiary amine compound.

In one embodiment of the present invention, the tertiary amine compound may be a compound represented by the following chemical formula 1.

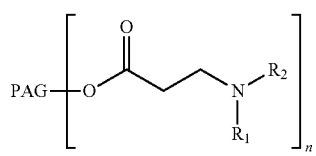

[Chemical Formula 1]

wherein,
PAG is polyalkylene glycol,
$R_1$ and $R_2$ are each independently $C_1$-$C_{20}$ alkyl group or aryl group, and
n is an integer of 1 to 6.

In one embodiment of the present invention, the adhesive composition can be for attaching an optical layer including a UV permeable region and a UV impermeable region.

In one embodiment of the present invention, the adhesive composition can be for attaching an optical layer including a UV permeable region and a UV impermeable region to a UV impermeable substrate.

In accordance with another aspect of the present invention, there is provided an optical laminate comprising a substrate; an adhesive layer formed of the adhesive composition laminated on the substrate; and an optical layer laminated on the adhesive layer.

Advantageous Effects

The adhesive composition according to the present invention can attach an optical layer simultaneously including a UV permeable region and a UV impermeable region, to various substrates including a UV impermeable substrate with excellent adhesive strength, and thereby, it can be effectively used for attaching a touch sensor onto various substrates such as a polarizing plate.

BRIEF DESCRIPTION OF THE DRAWINGS

FIG. 1 is a structural cross-sectional view of an optical laminate according to an embodiment of the present invention.

FIG. 2 is a structural cross-sectional view of a touch sensor included in an optical laminate according to an embodiment of the present invention.

BEST MODE

Hereinafter, the present invention will be described in more detail.

One embodiment of the present invention relates to an adhesive composition comprising a (meth)acrylate monomer, a photocurable (meth)acrylate oligomer, a photoinitiator and a tertiary amine compound.

In one embodiment of the present invention, the (meth) acrylate monomer can be a (meth)acrylate monomer having one (meth)acryloyloxy group in the molecule (hereinafter, referred to as "monofunctional (meth)acrylate monomer"), a (meth)acrylate monomer having two (meth)acryloyloxy groups in the molecule (hereinafter, referred to as "bifunctional (meth)acrylate monomer"), a (meth)acrylate monomer having three or more (meth)acryloyloxy groups in the molecule (hereinafter, referred to as "polyfunctional (meth) acrylate monomer"), or a mixture thereof. One kind or two or more kinds of the (meth)acrylate monomers may be used. In the present invention, the (meth)acrylate monomer refers to an acrylate and/or a methacrylate.

Specific examples of the monofunctional (meth)acrylate monomer include acryloylmorpholine, 2-hydroxyethyl (meth)acrylate, 2-hydroxypropyl (meth)acrylate, 3-hydroxypropyl (meth)acrylate, 2-hydroxybutyl (meth)acrylate, 2-hydroxy-3-phenoxypropyl (meth)acrylate, isobutyl (meth) acrylate, t-butyl (meth)acrylate, 2-ethylhexyl (meth)acrylate, cyclohexyl (meth)acrylate, dicyclopentenyl (meth) acrylate, benzyl (meth)acrylate, isobornyl (meth)acrylate, phenoxyethyl (meth)acrylate, dicyclopentenyloxyethyl (meth)acrylate, dimethylaminoethyl (meth)acrylate, ethylcarbitol (meth)acrylate, trimethylolpropane mono(meth) acrylate, pentaerythritol mono(meth)acrylate, phenoxypolyethylene glycol (meth)acrylate, and the like.

In addition, as the monofunctional (meth)acrylate monomer, a carboxylate group-containing (meth)acrylate monomer can be used. Specifically, 2-(meth)acryloyloxyethyl phthalic acid, 2-(meth)acryloyloxyethylhexahydro phthalic acid, carboxyethyl (meth)acrylate, 2-(meth)acryloyloxyethyl succinic acid, N-(meth)acryloyloxy-N',N'-dicarboxyp-phenylenediamine, 4-(meth)acryloyloxyethyl trimellitic acid, and the like can be mentioned. Further, (meth)acryloylamino group-containing monomers such as 4-(meth) acryloylamino-1-carboxylmethyl piperidine, and the like can be used.

Exemplary bifunctional (meth)acrylate monomers include alkylene glycol di(meth)acrylates, polyoxyalkylene glycol di(meth)acrylates, halogen-substituted alkylene glycol di(meth)acrylates, di(meth)acrylates of aliphatic polyols, di(meth)acrylates of hydrogenated dicyclopentadiene or tricyclodecanedialkanol, di(meth)acrylates of dioxane glycol or dioxane dialkanol, di(meth)acrylates of alkylene oxide adduct of bisphenol A or bisphenol F, and epoxy di(meth) acrylates of bisphenol A or bisphenol F, but are not limited thereto.

More specific examples of the bifunctional (meth)acrylate monomers include ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylol propane di(meth)acrylate, pentaerythritol di(meth) acrylate, ditrimethyloyl propane di(meth)acrylate, diethylene glycol di(meth)acrylate, triethylene glycol di(meth) acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxypivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecane dimethanol di(meth)acrylate, 1,3-dioxane-2, 5-diyl di(meth)acrylate [alternative name: dioxane glycol di(meth)acrylate], di(meth)acrylate of acetal compound of hydroxypivalaldehyde and trimethylolpropane [compound name: 2-(2-hydroxy-1,1-dimethylethyl)-5-ethyl-5-hydroxymethyl-1,3-dioxane], di(meth)acrylate of 1,3,5-tris(2-hydroxyethyl) isocyanurate, and the like.

Representative examples of the polyfunctional (meth) acrylate monomers include poly(meth)acrylates of trifunctional or higher functional aliphatic polyols such as glycerin tri(meth)acrylate, trimethylol propane tri(meth)acrylate, ditrimethylol propane tri(meth)acrylate, ditrimethylol propane tetra(meth)acrylate, pentaerythritol tri(meth)acrylate, pentaerythritol tetra(meth)acrylate, dipentaerythritol tetra(meth) acrylate, dipentaerythritol penta(meth)acrylate, dipentaerythritol hexa(meth)acrylates, and the like. Other examples include a poly(meth)acrylate of trifunctional or higher functional halogen-substituted polyol, a tri(meth) acrylate of alkylene oxide adduct of glycerin, a tri(meth) acrylate of alkylene oxide adduct of trimethylolpropane, 1,1,1-tris[(meth)acryloyloxyethoxyethoxy]propane, tri (meth)acrylate of 1,3,5-tris(2-hydroxyethyl)isocyanate, siliconehexa (meth)acrylate, and the like.

The (meth)acrylate monomer can be used in an amount of 20 to 80% by weight based on 100% by weight of the total weight of the adhesive composition. If the content of the (meth)acrylate monomer is less than 20% by weight, it may be difficult to realize an adhesive composition having a low viscosity. When the content thereof is more than 80% by weight, the degree of curing of the UV impermeable region may be lowered due to degradation of the degree of crosslinking.

In one embodiment of the present invention, the photocurable (meth)acrylate oligomer may be a urethane (meth) acrylate oligomer, a polyester (meth)acrylate oligomer, or a mixture thereof. The photocurable (meth)acrylate oligomer may be used alone or in combination of two or more.

The urethane (meth)acrylate oligomer is a compound having a urethane bond (—NHCOO—) and at least two (meth)acryloyloxy groups in the molecule. Specifically, it can be a product of a urethane-forming reaction between a (meth)acrylate monomer having at least one (meth)acryloyloxy group and at least one hydroxy group in the molecule and a polyisocyanate; or a product of a urethane-forming reaction between a terminal isocyanate group-containing urethane compound obtained by allowing a polyol to react with a polyisocyanate, and a (meth)acylate monomer having at least one (meth)acryloyloxy group and at least one hydroxy group in the molecule.

Examples of the hydroxy group-containing (meth)acrylate monomer used in the urethane-forming reaction include 2-hydroxyethyl (meth)acrylate, 2-hydroxypropyl (meth) acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri(meth) acrylate, dipentaerythritol penta(meth)acrylate and the like.

Examples of the polyisocyanate used in the urethaneforming reaction with such a hydroxy group-containing (meth)acrylate monomer can include polyisocyanates that are di- or triisocyanates such as hexamethylene diisocyanate, lysine diisocyanate, isophorone diisocyanate, dicyclohexylmethane diisocyanate, tolylene diisocyanate, xylylene diisocyanate, diisocyanates obtained by hydrogenating an aromatic isocyanate among these diisocyanates (for example, diisocyanates such as hydrogenated tolylene diisocyanate and hydrogenated xylylene diisocyanate), triphenylmethane triisocyanate, dimethylenetriphenyl triisocyanate and dibenzyl benzene triisocyanate, or polyisocyanates obtained by multimerizing diisocyanates.

In addition, as the polyols that can be used to produce a terminal isocyanate group-containing urethane compound by reaction with polyisocyanates, there may be mentioned aromatic, aliphatic and alicyclic polyols, a polyester polyol, a polyether polyol, and the like. Examples of the aliphatic and alicyclic polyols include 1,4-butanediol, 1,6-hexanediol, ethylene glycol, diethylene glycol, triethylene glycol, propylene glycol, neopentyl glycol, trimethylol ethane, trimethylol propane, ditrimethylol propane, pentaerythritol, dipentaerythritol, dimethylol heptane, dimethylol propionic acid, dimethylol butanoic acid, glycerin, hydrogenated bisphenol A, and the like.

The polyester polyol can be a product obtained by a condensation reaction between the polyols and a polybasic carboxylic acid or an anhydride thereof. Examples of the polybasic carboxylic acid or anhydride thereof include (anhydrous) succinic acid, adipic acid, (anhydrous) maleic acid, (anhydrous) itaconic acid, (anhydrous) trimellitic acid, (anhydrous) pyromellitic acid, hexahydro (anhydrous) phthalic acid, (anhydrous) phthalic acid, isophthalic acid, terephthalic acid, and the like.

Examples of the polyether polyols include a polyalkylene glycol, or a polyoxyalkylene-modified polyol obtained through reaction between the polyols or dihydroxybenzenes and alkylene oxides.

The polyester (meth)acrylate oligomer is a compound having an ester bond and at least two (meth)acryloyloxy groups in the molecule. Specifically, it can be obtained by a condensation reaction of a (meth)acrylic acid, a polybasic carboxylic acid or an anhydride thereof and a polyol. Examples of the polybasic carboxylic acid or the anhydride thereof used in the condensation reaction include (anhydrous) succinic acid, adipic acid, (anhydrous) maleic acid, (anhydrous) itaconic acid, (anhydrous) trimellitic acid, (anhydrous) pyromellitic acid, hexahydro (anhydrous) phthalic acid, (anhydrous) phthalic acid, isophthalic acid, terephthalic acid, and the like. Examples of the polyols used in the condensation reaction include 1,4-butanediol, 1,6-hexanediol, ethylene glycol, diethylene glycol, triethylene glycol, propylene glycol, neopentyl glycol, trimethylolethane, trimethylolpropane, ditrimethylolpropane, pentaerythritol, dipentaerythritol, dimethylolheptane, dimethylolpropionic acid, dimethylolbutanoic acid, glycerin, hydrogenated bisphenol A, and the like.

The photocurable (meth)acrylate oligomer has a number average molecular weight of 500 to 5,000. When the number average molecular weight of the photocurable (meth)acrylate oligomer is less than 500, the degree of curing of the adhesive composition may be lowered. When the number average molecular weight exceeds 5,000, the viscosity of the oligomer becomes high and thus it may be difficult to realize an adhesive composition having a low viscosity, and the curing rate becomes very slow, making the curing of the UV impermeable region difficult.

The photocurable (meth)acrylate oligomer can be used in an amount of 20 to 70% by weight based on 100% by weight of the total weight of the adhesive composition. When the content of the photocurable (meth)acrylate oligomer is less than 20% by weight, the degree of crosslinking becomes low and thus sufficient curing cannot be performed. If the content exceeds 70% by weight, the viscosity becomes high and thus it may be difficult to reduce the coating thickness of the adhesive.

In one embodiment of the present invention, the photoinitiator can be used without limitation as long as it is used in the relevant art. In particular, as the photoinitiator, a long-wavelength photoinitiator having an absorption wavelength at 400 nm or more can be used. Specifically, a phosphine oxide-based photoinitiator may be used as the photoinitiator. Examples of commercially available phosphine oxide-based photoinitiators include his (2,4,6-trimethylbenzoyl)-4-methylphenylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis (2,4,6-trimethylbenzoyl)-2,3,5,6-tetramethylphenylphosphine oxide, 2,4,6-trimethylbenzoyl-diphenylphosphine oxide (TPO), bis(2,4,6-trimethylbenzoyl)-phenylphosphine oxide (Irgacure-819), and the like.

The photoinitiator can be used in an amount of 1 to 10% by weight based on 100% by weight of the total weight of the adhesive composition. When the content of the photoinitiator is less than 1% by weight, sufficient radicals are not generated and thus the curing rate may become slow. When the content is more than 10% by weight, there arises a problem of deterioration of reliability due to unreacted photoinitiator and a problem of deterioration of cohesion due to insufficient increase in the molecular weight of the cured coating film.

In one embodiment of the present invention, the tertiary amine compound may be a compound represented by the following chemical formula 1.

[Chemical Formula 1]

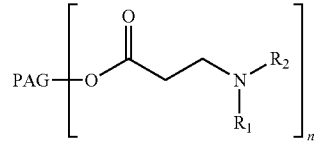

wherein,

PAG is polyalkylene glycol, $R_1$ and $R_2$ are each independently $C_1$-$C_{20}$ alkyl group or aryl group, and n is an integer of 1 to 6.

The polyalkylene glycol as used herein means a polymer having a linear or branched alkylene glycol having 2 to 6 carbon atoms as a repeating unit, and examples thereof include polyethylene glycol, polypropylene glycol, polybutylene glycol, and the like, but are not limited thereto. In this case, the number of the alkylene glycol repeating units may be 2 to 10.

The polyalkylene glycol may have various structures such as linear, branched, multi-armed, forked, pendant or dendrimeric.

The $C_1$-$C_{20}$ alkyl group as used herein refers to a linear or branched monovalent hydrocarbon having 1 to 20 carbon atoms, and examples thereof include methyl, ethyl, n-propyl, i-propyl, n-butyl, i-butyl, t-butyl, pentyl, hexyl, and the like, but are not limited thereto.

The aryl group as used herein includes all of aromatic groups, heteroaromatic groups, or partially reduced derivatives thereof. The aromatic group means a 5 to 15-membered simple or fused ring, and the heteroaromatic group means an aromatic group containing at least one atom selected from oxygen, sulfur and nitrogen. Representative examples of the aryl group include phenyl, naphthyl, pyridinyl, furanyl, thiophenyl, indolyl, quinolinyl, imidazolinyl, oxazolyl, thiazolyl, tetrahydronaphthyl, etc., but are not limited thereto.

In one embodiment of the present invention, the PAG is polypropylene glycol, $R_1$ and $R_2$ are ethyl groups, and n may be 2.

In one embodiment of the present invention, the polypropylene glycol may have 2 to 4 propylene glycol repeating units.

The tertiary amine compound can be prepared by subjecting a polyalkylene glycol and an acrylic acid to a condensation reaction to obtain a polyalkylene glycol acrylate, and then subjecting the polyalkylene glycol acrylate and a secondary amine compound to an addition reaction.

The tertiary amine compound can stabilize radicals and transfer them to the deep part, thereby making the curing performed sufficiently in the UV impermeable region even when ultraviolet irradiation is performed only in the UV permeable region.

The tertiary amine compound may be used in an amount of 1 to 20% by weight based on 100% by weight of the adhesive composition. If the content of the tertiary amine compound is less than 1% by weight, the radical stabilizing effect of the tertiary amine compound is not sufficient and thus the curing of the UV impermeable region may not be sufficient. When the content exceeds 20% by weight, the content of the photocurable component may relatively decrease, and the curability and the adhesive strength may be lowered.

The adhesive composition according to one embodiment of the present invention may further comprise additives known in the relevant art as needed. The type of the additives is not particularly limited and includes, for example, a photosensitizer, a silane coupling agent, an adhesion promoter, a leveling agent, an ultraviolet absorber, an anti-aging agent, a dye, a processing aid, an ion trapping agent, an antioxidant, a tackifier, a filler, a plasticizer, a foaming inhibitor, an antistatic agent, a fragrant agent, a surfactant, and the like. These may be used alone or in combination of two or more.

The content of the additives is not particularly limited, and for example, the additives can be included in an amount of 0.01 to 3% by weight, preferably 0.5 to 1% by weight, based on 100% by weight of the total weight of the adhesive composition.

The adhesive composition according to one embodiment of the present invention can be suitably used for attaching an optical layer including a UV permeable region and a UV impermeable region. In particular, the adhesive composition according to one embodiment of the present invention can be suitably used for attaching an optical layer including a UV permeable region and a UV impermeable region to a UV impermeable substrate.

Referring to FIG. 1, one embodiment of the present invention relates to an optical laminate comprising a substrate 100; an adhesive layer 200 formed of the adhesive composition laminated on the substrate; and an optical layer 300 laminated on the adhesive layer.

The optical laminate according to one embodiment of the present invention can be produced by, for example, a coating step of coating the adhesive composition of the present invention onto a substrate in an uncured state to form an adhesive-coated surface, an attaching step of attaching an optical layer onto the adhesive-coated surface, and a curing step of curing the adhesive composition.

There is no particular limitation on the coating method of the adhesive composition, and various coating methods such as a doctor blade, a wire bar, a die coater, a comma coater, and a gravure coater can be used.

After the adhesive composition of the present invention is coated onto the substrate, the optical layer is adhered onto the adhesive-coated surface and then the adhesive composition is cured by irradiation of active energy ray to fix the optical layer on the substrate.

The light source of the active energy ray is not particularly limited, but an active energy ray having a light emission distribution with a wavelength of 400 nm or less is preferable. Specifically, a low pressure mercury lamp, a medium-pressure mercury lamp, a high pressure mercury lamp, a ultra-high pressure mercury lamp, a chemical lamp, a black light lamp, a microwave-excited mercury lamp, a metal halide lamp and the like are preferable. The intensity of light irradiation to the adhesive composition is appropriately determined depending on the composition of the adhesive composition, and is not particularly limited, but the irradiation intensity in the wavelength range effective for activating the photoinitiator is preferably 0.1 to 6,000 mW/cm$^2$. When the irradiation intensity is 0.1 mW/cm$^2$ or more, the reaction time does not become excessively long. When the irradiation intensity is 6,000 mW/cm$^2$ or less, there is little risk of yellowing due to heat radiated from the light source or heat generated during curing of the adhesive composition, or of deterioration of the substrate and/or the optical layer. The light irradiation time of the adhesive composition is controlled for each adhesive composition to be cured, and is not particularly limited, but it is preferable that the integrated light amount expressed as a product of the irradiation intensity and the irradiation time is set to 10 to 10,000 mJ/cm$^2$. When the integrated light amount of the adhesive is 10 mJ/cm$^2$ or more, a sufficient amount of the active species derived from the photoinitiator is generated so that the curing reaction can proceed more reliably. When the integrated light amount of the adhesive is 10,000 mJ/cm$^2$ or less, the irradiation time is not excessively lengthened, thereby maintaining good productivity.

The thickness of the adhesive layer 200 can be adjusted depending on the adhesive strength, and is preferably 0.01 to 10 μm, more preferably 0.1 to 5 μm. When the thickness of the adhesive layer 200 is less than 0.01 μm, there is a problem that the possibility of incorporation of bubbles is high at the time of attachment. When the thickness of the adhesive layer is more than 10 μm, there is a problem that the price increases.

In one embodiment of the present invention, the substrate 100 may be ultraviolet (UV) impermeable. For example, the substrate 100 may be a polarizing plate or a polyimide film.

In one embodiment of the present invention, the optical layer 300 may include a UV permeable region and a UV impermeable region. For example, the optical layer 300 may be a touch sensor.

The touch sensor may be a touch sensor that forms a separation layer on a carrier substrate and performs a touch sensor forming step, and allows the separation layer to be used as a wiring covering layer when separated from the carrier substrate. For example, the touch sensor may be a film touch sensor having a film shape.

Specifically, the touch sensor may include a separation layer 310; an electrode pattern layer 330 formed on the separation layer; and an insulation layer 340 formed on the top of the electrode pattern layer and formed so as to cover the electrode pattern layer, as shown in FIG. 2.

The separation layer 310 is a polymer organic film, which is coated on a carrier substrate, and an electrode pattern layer or the like is formed thereon. Then the separation layer is finally separated from the carrier substrate.

The peeling force of the separation layer 310 is preferably 1 N/25 mm or less, more preferably 0.1 N/25 mm or less. In other words, it is desirable that the separation layer 310 be formed of a material such that the physical force applied when separating the separation layer 310 from the carrier substrate does not exceed 1 N/25 mm, especially 0.1 N/25 mm.

When the separation layer 310 has a peeling force of more than 1 N/25 mm, the separation layer 310 may remain on the carrier substrate without being separated clearly at the time of separation from the carrier substrate. Further, there is a possibility that cracks may occur at any point of the separation layer 310, the protective layer 320, the electrode pattern layer 330, and the insulation layer 340.

Particularly, the peeling force of the separation layer 310 is preferably 0.1 N/25 mm or less. When it is 0.1 N/25 mm or less, it is more preferable in that the curls can be controlled after peeling from the carrier substrate. The curls do not cause any problem in terms of the function of the touch sensor, but may reduce the efficiency of the process such as an attaching process and a cutting process, and thus it is advantageous to minimally cause curls.

Further, the thickness of the separation layer 310 is preferably 10 to 1,000 nm, more preferably 50 to 500 nm. If the thickness of the separation layer 310 is less than 10 nm, the uniformity at the time of coating of the separation layer is deteriorated so that the electrode pattern formation may be unevenly formed, the peeling force is locally increased so that tearing is generated, or curls are not controlled in the touch sensor after separated from the carrier substrate. When the thickness exceeds 1,000 nm, there is a problem that the peeling force is no longer lowered, and that the flexibility is lowered.

An electrode pattern layer 330 is formed on the top of the separation layer 310. After the separation layer 310 is separated from the carrier substrate, it functions as a covering layer for covering the electrode pattern layer 330 or as a protective layer for protecting the electrode pattern layer 330 from external contact.

At least one protective layer 320 can be further formed on the top of the separation layer 310. Since it may be difficult to protect the electrode pattern against external contracts and impact with only separation layer 310, at least one protective layer 320 may be formed on the separation layer 310.

The protective layer 320 includes at least one of an organic insulating film or an inorganic insulating film and can be formed through a coating and curing, or vapor deposition.

An electrode pattern layer 330 is formed on the top of the separation layer 310 or the protective layer 320. The electrode pattern layer 330 is configured to include a sensing electrode for sensing the touch and a pad electrode formed at one end of the sensing electrode. Here, the sensing electrode may include not only an electrode for sensing a touch but also a wiring pattern connected to the electrode.

The electrode pattern layer 330 is a transparent conductive layer, and may be formed of at least one material selected from the group consisting of a metal, a metal nanowire, a metal oxide, a carbon nanotube, a graphene, a conductive polymer, and a conductive ink.

The pattern structure of the electrode pattern layer is preferably an electrode pattern structure used in the electrostatic capacity method, and mutual-capacitance or self-capacitance may be applied.

In the case of mutual-capacitance, it may be a lattice electrode structure having a horizontal axis and a vertical axis. Bridge electrodes may be formed at the intersections of the electrodes on the horizontal axis and the vertical axis, or the horizontal axis electrode pattern layer and the vertical axis electrode pattern layer may be formed and electrically separated from each other.

In the case of a self-capacitance type, it may be an electrode layer structure in which a change in capacitance is read using one electrode at each point.

An insulation layer 340 is formed on the top of the electrode pattern layer 330. The insulation layer can prevent corrosion of the electrode pattern and protect the surface of the electrode pattern. It is preferable that the insulation layer 340 is formed to have a constant thickness by filling the gap between the electrodes or the wiring. In other words, the surface opposite to the surface in contact with the electrode pattern layer 330 is preferably formed flat so as not to expose the irregularities of the electrode.

The insulation layer is not particularly limited as long as it is an organic insulating material, but it is preferable to be a thermosetting or a UV curable organic polymer.

The pad electrode of the touch sensor may be electrically connected to the circuit board. The circuit board is, for example, a flexible printed circuit board (FPCB), and functions to electrically connect the touch control circuit and the touch sensor.

The optical laminate according to one embodiment of the present invention can have a shape in which the separation layer 310 of the touch sensor is connected to the adhesive layer 200.

Hereinafter, the present invention will be described in more detail with reference to examples, comparative examples and experimental examples. It should be apparent to those skills in the art that these examples, comparative examples and experimental examples are for illustrative purpose only, and the scope of the present invention is not limited thereto.

Example 1 and Comparative Examples 1 to 5: Preparation of Adhesive Composition

Adhesive compositions were prepared by mixing the components with the composition shown in Table 1 (unit: parts by weight).

TABLE 1

|  |  | Example | Comparative Examples | | | | |
|---|---|---|---|---|---|---|---|
|  |  | 1 | 1 | 2 | 3 | 4 | 5 |
| (meth)acrylate monomer | | 50 | 50 | 50 | 50 | 50 | 50 |
| photocurable (meth)acrylate oligomer | | 50 | 50 | 50 | 50 | 50 | 50 |
| photoinitiator | photoinitiator 1 | 3 | 2 | 3 | 4 | 5 | |
|  | photoinitiator 2 | | | | | | 3 |
| tertiary amine compound | | 5 | | | | | |

(Meth)acrylate monomer: acryloylmorpholine
Photocurable (meth)acrylate oligomer: Miramer M240 (Miwon Specialty Chemical Co. Ltd, number average molecular weight: 512)
Photoinitiator 1: Irgacure TPO (BASF)
Photoinitiator 2: Irgacure 184 (BASF)
Tertiary amine compound: a compound of chemical formula 1 wherein PAG is tripropylene glycol, $R_1$ and $R_2$ are ethyl group, and n is 2 (AM 001, EONANOCHEM Co., Ltd.)

Experimental Example 1

The physical properties of the adhesive compositions prepared in Example and Comparative Examples were measured by the methods described below, and the results are shown in Table 2 below.

(1) Uncured Width in the UV Impermeable Region

The adhesive compositions prepared in Example and Comparative Examples were applied in a thickness of 5 μm between a 100 μm PET film and a 50 μm release film. After a masking treatment on the release film at a width of 18.5 mm so as not to allow UV permeation, it was UV-cured with a metal halide lamp (UV integrated light amount: 600 mJ/cm$^2$, irradiation intensity: 40 mW/cm$^2$) to obtain a cured coating film.

The release film was removed and the length of the uncured width was measured.

(2) Peeling Force

The adhesive compositions prepared in Example and Comparative Examples were coated in a thickness of 5 μm between two 100 μm PET films, and were UV-cured with a metal halide lamp (UV integrated light amount: 600 mJ/cm$^2$, irradiation intensity: 40 mW/cm$^2$), and cut to a width of 25 mm. Thereby, the peeling force was measured using 180-degree peel tester.

TABLE 2

|  | Uncured width (mm) | Peeling force (N/25 mm) |
|---|---|---|
| Example 1 | 7.0 | 9 |
| Comparative Example 1 | 13.1 | 6 |
| Comparative Example 2 | 12.5 | 7 |
| Comparative Example 3 | 12.3 | 6 |
| Comparative Example 4 | 11.8 | 7 |
| Comparative Example 5 | 18.5 | 8 |

As shown in Table 2, it was confirmed that in the case of the adhesive composition of Example 1 according to the present invention, the curing of the UV impermeable region was more progressed as compared with that of the adhesive compositions of Comparative Examples 1 to 5.

It was confirmed through Comparative Examples 1 to 4 that curing of the UV impermeable region was further progressed depending on the increase in the content of the photoinitiator 1. In Example 1 to which a tertiary amine compound was added while using the same photoinitiator 1 as in Comparative Example 2, the curability of the UV impermeable region was drastically increased, whereby the effect of the tertiary amine compound for curing the UV impermeable region could be confirmed. On the other hand, when a short wavelength initiator was used in Comparative Example 5, it was found that no curing of the UV-impermeable region occurred.

Although particular embodiments of the present invention have been shown and described in detail, it will be obvious to those skilled in the art that these specific techniques are merely preferred embodiments and the scope of the inventions is not limited thereto. It will be understood by those skilled in the art that various changes and modifications may be made to the invention without departing from the spirit and scope of the invention.

The substantial scope of the present invention, therefore, is to be defined by the appended claims and equivalent thereof.

[Description of Reference Numerals]

| 100: Substrate | 200: Adhesive layer |
|---|---|
| 300: Optical layer | 310: Separation layer |
| 320: Protective layer | 330: Electrode pattern layer |
| 340: Insulation layer | |

The invention claimed is:

1. An adhesive composition comprising:
a (meth)acrylate monomer,
a photocurable (meth)acrylate oligomer,
a photoinitiator, and
a tertiary amine compound,
wherein the photoinitiator allows radicals to be generated at a wavelength of 400 nm or more, and
wherein the tertiary amine compound is a compound of the following chemical formula 1:

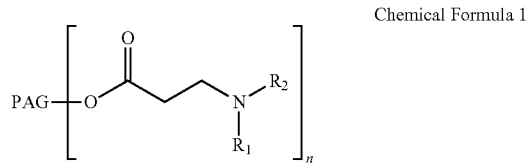

Chemical Formula 1 wherein,
PAG is polyalkylene glycol having 3 to 4 alkylene glycol repeating units,
$R_1$ and $R_2$ are each independently $C_1$-$C_{20}$ alkyl group, and
n is an integer of 1 to 6.

2. The adhesive composition according to claim 1, wherein the PAG is polypropylene glycol, $R_1$ and $R_2$ are ethyl groups, and n is 2.

3. The adhesive composition according to claim 2, wherein the polypropylene glycol has 3 to 4 propylene glycol repeating units.

4. An optical laminate comprising:
a substrate;
an adhesive layer formed of the adhesive composition of claim 3 laminated on the substrate; and
an optical layer laminated on the adhesive layer.

5. An optical laminate comprising:
a substrate;
an adhesive layer formed of the adhesive composition of claim 2 laminated on the substrate; and
an optical layer laminated on the adhesive layer.

6. The adhesive composition according to claim 1, wherein the photocurable (meth)acrylate oligomer is a urethane (meth)acrylate oligomer, a polyester (meth)acrylate oligomer, or a mixture thereof.

7. An optical laminate comprising:
a substrate;
an adhesive layer formed of the adhesive composition of claim 6 laminated on the substrate; and
an optical layer laminated on the adhesive layer.

8. The adhesive composition according to claim 1, wherein the adhesive composition is for attaching an optical layer including a UV permeable region and a UV impermeable region.

9. An optical laminate comprising:
a substrate;
an adhesive layer formed of the adhesive composition of claim 8 laminated on the substrate; and
the optical layer laminated on the adhesive layer.

10. The adhesive composition according to claim 1, wherein the adhesive composition is for attaching an optical layer including a UV permeable region and a UV impermeable region with a UV impermeable substrate.

11. An optical laminate comprising:
a substrate;
an adhesive layer formed of the adhesive composition of claim 10 laminated on the substrate; and
the optical layer laminated on the adhesive layer.

12. An optical laminate comprising:
a substrate;
an adhesive layer formed of the adhesive composition of claim 1 laminated on the substrate; and
an optical layer laminated on the adhesive layer.

13. The optical laminate according to claim 12, wherein the substrate is UV impermeable.

14. The optical laminate according to claim 12, wherein the substrate is a polarizing plate or a polyimide film.

15. The optical laminate according to claim 12, wherein the optical layer includes a UV permeable region and a UV impermeable region.

16. The optical laminate according to claim 12, wherein the optical layer is a touch sensor.

* * * * *